United States Patent
Kovach

(10) Patent No.: US 11,178,803 B2
(45) Date of Patent: Nov. 23, 2021

(54) REPLACEABLE SHANK WEAR SHIN

(71) Applicant: CNH Industrial America LLC, New Holland, PA (US)

(72) Inventor: Michael G. Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 96 days.

(21) Appl. No.: 16/547,825

(22) Filed: Aug. 22, 2019

(65) Prior Publication Data

US 2021/0051831 A1 Feb. 25, 2021

(51) Int. Cl.
- *A01B 15/02* (2006.01)
- *A01B 15/04* (2006.01)
- *A01B 15/00* (2006.01)
- *A01B 3/46* (2006.01)

(52) U.S. Cl.
CPC ............... *A01B 15/04* (2013.01); *A01B 3/46* (2013.01); *A01B 15/00* (2013.01); *A01B 15/025* (2013.01)

(58) Field of Classification Search
CPC ....... A01B 15/00; A01B 15/025; A01B 15/04; A01B 15/10; A01B 3/46
USPC ........................................................ 172/719
See application file for complete search history.

(56) References Cited

U.S. PATENT DOCUMENTS

| | | | |
|---|---|---|---|
| 3,137,352 A | 6/1964 | Petersen | |
| 3,254,727 A | 6/1966 | Helton et al. | |
| 3,387,668 A * | 6/1968 | Mathers | A01B 15/025 172/719 |
| 3,398,799 A | 8/1968 | Richey et al. | |
| 3,536,147 A | 10/1970 | Norton et al. | |
| 3,704,753 A | 12/1972 | Hasforth et al. | |
| 3,999,614 A * | 12/1976 | Rhoads | E02F 9/2875 172/719 |
| 4,799,823 A | 1/1989 | Williams | |
| 4,932,478 A * | 6/1990 | Jones | A01B 15/025 172/699 |
| 5,119,888 A * | 6/1992 | Hall | E02F 5/027 172/699 |
| 5,398,625 A | 3/1995 | Johnson et al. | |
| 5,964,300 A | 10/1999 | Wattonville et al. | |
| 6,688,243 B1 * | 2/2004 | Buchholtz | A01B 49/06 111/139 |
| 8,887,826 B2 | 11/2014 | Rivera et al. | |
| 10,743,452 B2 * | 8/2020 | Ihde | A01B 13/08 |
| 2019/0047042 A1 | 2/2019 | Reynolds | |

FOREIGN PATENT DOCUMENTS

| | | |
|---|---|---|
| GB | 2 031 252 A | 4/1980 |
| GB | 2 209 651 A | 5/1989 |
| GB | 2 232 568 A | 12/1990 |

* cited by examiner

*Primary Examiner* — Gary S Hartmann
(74) *Attorney, Agent, or Firm* — Rebecca L. Henkel; Rickard K. DeMille

(57) ABSTRACT

A shank assembly for an agricultural tillage implement including a shank, a point removably connected to the shank, and a protective guard removably connected in between the point and the shank. The point retains the protective guard on the shank. The protective guard is configured for protecting the shank and flexing in response to a movement of the shank.

19 Claims, 2 Drawing Sheets

REPLACEABLE SHANK WEAR SHIN

BACKGROUND OF THE INVENTION

The present invention pertains to agricultural tillage implements and, more specifically, to a shank assembly for an agricultural tillage implement.

Farmers utilize a wide variety of tillage implements to prepare soil for planting. Tillage implements prepare the soil by way of mechanical agitation of numerous types, such as digging, stirring, and overturning. Examples of tillage include plowing (overturning with moldboards or chiseling with chisel shanks), disking, harrowing, sweeping, and cultivating with cultivator shanks. Tillage implements are often classified into two types: vertical or horizontal tillage. Generally, vertical tillage is performed with implements such as coulters or spider wheels. Horizontal tillage, on the other hand, is performed with implements such as sweeps. The employment of vertical and/or horizontal tillage depends upon various aspects of a given situation including soil conditions, equipment, crops to be planted, etc.

Some tillage implements may include two or more sections coupled together to perform multiple functions as they are pulled through fields by an agricultural vehicle. For example, a field cultivator is capable of simultaneously tilling soil and leveling the tilled soil in preparation for planting. Field cultivators convert compacted soil into a level seedbed with a consistent depth for providing optimal conditions for planting of a crop. Residual crop material, weeds, or other undesired plants disposed on top of the soil are destroyed and worked into the soil.

A typical field cultivator generally includes a frame that carries a number of ground-engaging tools for working the soil. The tools may include shovels, knives, points, sweeps, coulters, spikes, or plows. For example, a field cultivator may include shank assemblies for creating a level seedbed to facilitate optimal seed growth. Some field cultivators may also include rear auxiliary tools to perform various secondary tasks for finishing the soil. For example, a field cultivator may also include a spike tooth harrow, spring tooth harrow, rolling (aka. crumbler) basket, etc., or any combination thereof for finishing the soil.

A shank assembly generally includes a shank, a sweep or point removably connected to the end of the shank, and a biasing mechanism, e.g. spring or actuator, operably coupled to the shank to provide a preset downforce thereon. Each shank is typically in the form of a rigid shaft, which may be straight or curved. Each point is attached to the front edge at the bottom of a respective shank, and thus the points serve as the primary point of engagement with the soil. Generally, the points are designed to be replaceable, i.e., consumable, so that when they become worn after multiple uses they may be replaced. Although shanks are not the primary point of engagement, the shanks which carry the points may also become worn as soil passes around the front and sides of each shank as the field cultivator is pulled across the field.

To reduce wear on each shank, a protective guard or shin may be added to the front of each shank. For example, a shin may be separately bolted onto the front of the shank so that the soil contacts the shin instead of the shank. The shin may have a "U"-shaped body which at least partially wraps around the front and sides of a given shank. Such shins help to reduce the wear on the shanks; however, the shins require additional mounting hardware to attach the shins onto the shanks. For instance, the shins may require separate brackets and/or bolts. The additional mounting hardware may increase the overall cost of the shank assembly.

What is needed in the art is a cost-effective protective shin for a shank which can be easily replaced.

SUMMARY OF THE INVENTION

In one exemplary embodiment formed in accordance with the present invention, there is provided a shank assembly that generally includes a shank, a point, and a protective guard connected in between the point and the shank. The point retains the protective guard on the shank such that no additional mounting hardware is required to mount the protective guard. The protective guard protects the shank and flexes in response to a movement of the shank.

In another exemplary embodiment formed in accordance with the present invention, there is provided a shank assembly for an agricultural tillage implement. The shank assembly includes a shank, a point removably connected to the shank, and a protective guard removably connected in between the point and the shank such that the point retains the protective guard on the shank. The protective guard is configured for protecting the shank and flexing in response to a movement of the shank.

In yet another exemplary embodiment formed in accordance with the present invention, there is provided an agricultural tillage implement for an agricultural vehicle including a frame and a shank assembly connected to the frame. The shank assembly includes a shank, a point removably connected to the shank, and a protective guard removably connected in between the point and the shank such that the point retains the protective guard on the shank. The protective guard is configured for protecting the shank and flexing in response to a movement of the shank.

In yet another exemplary embodiment formed in accordance with the present invention, there is provided a method of operating an agricultural tillage implement. The method includes an initial step of providing a shank assembly for the agricultural tillage implement. The shank assembly includes a shank, a point removably connected to the shank, and a protective guard removably connected in between the point and the shank such that the point retains the protective guard on the shank. The protective guard is configured for protecting the shank and flexing in response to a movement of the shank. The method also includes either step of attaching or detaching the protective guard. The method may include attaching the protective guard by positioning the protective guard in between the point and the shank and fastening the point to the shank with at least one fastener such that the same at least one fastener mounts the point and the protective guard to the shank. The method may also include detaching the protective guard by unfastening the point from the shank and removing the protective guard from the shank.

One possible advantage of the exemplary embodiment of the shank assembly is that the shin protects and helps to reduce the wear of the shank.

Another possible advantage of the exemplary embodiment of the shank assembly is that the shin is retained only by using the point itself and thereby does not require additional mounting hardware.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

The terms "forward", "rearward", "left" and "right", when used in connection with the agricultural tillage implement and/or components thereof are usually determined with reference to the direction of forward operative travel of the agricultural vehicle, but they should not be construed as limiting. The terms "longitudinal" and "transverse" are determined with reference to the fore-and-aft direction of the agricultural tillage implement and are equally not to be construed as limiting.

Figure 1:
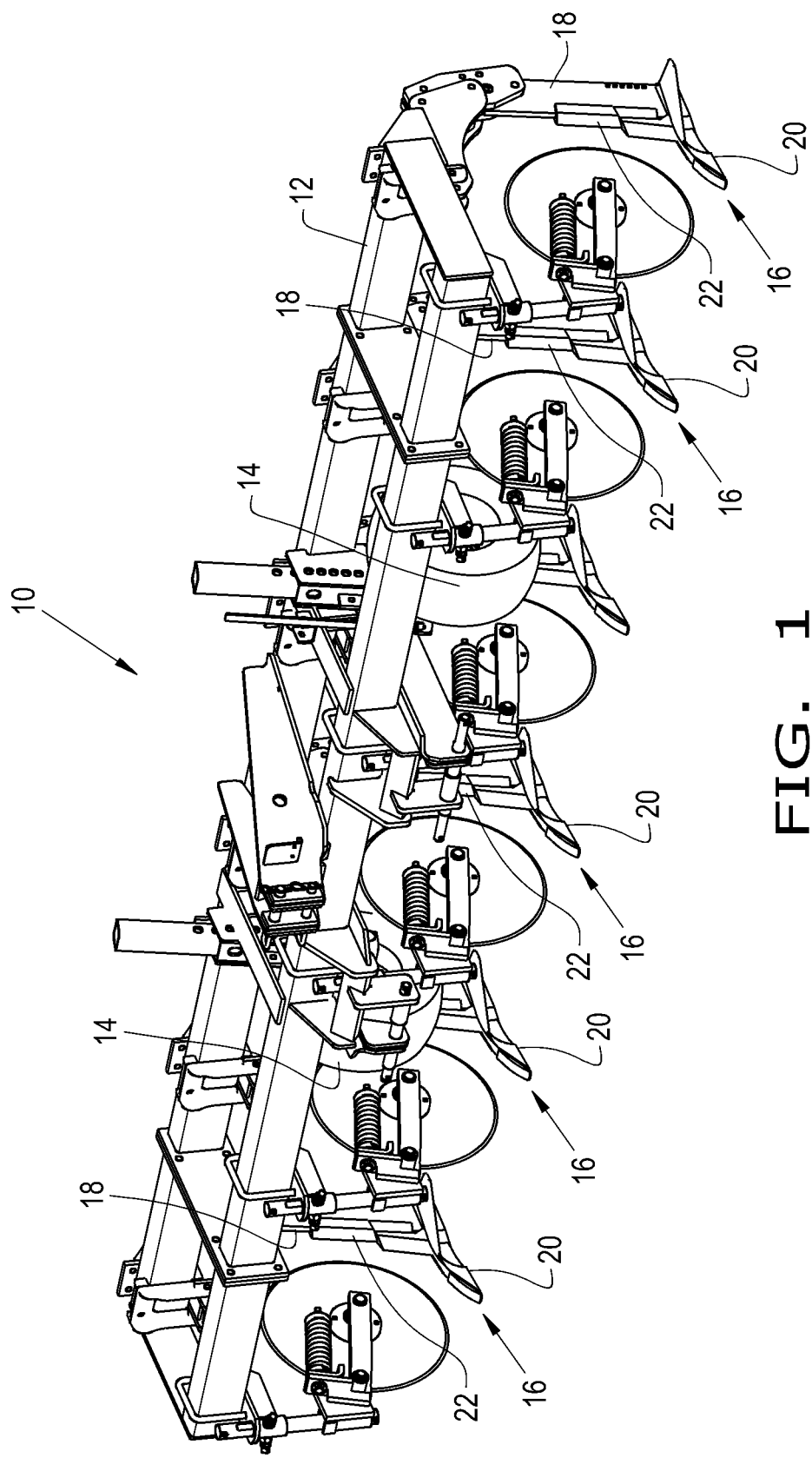
FIG. 1 illustrates a perspective view of an exemplary embodiment of an agricultural tillage implement that includes multiple shank assemblies, in accordance with an exemplary embodiment of the present invention.
Figure 2:
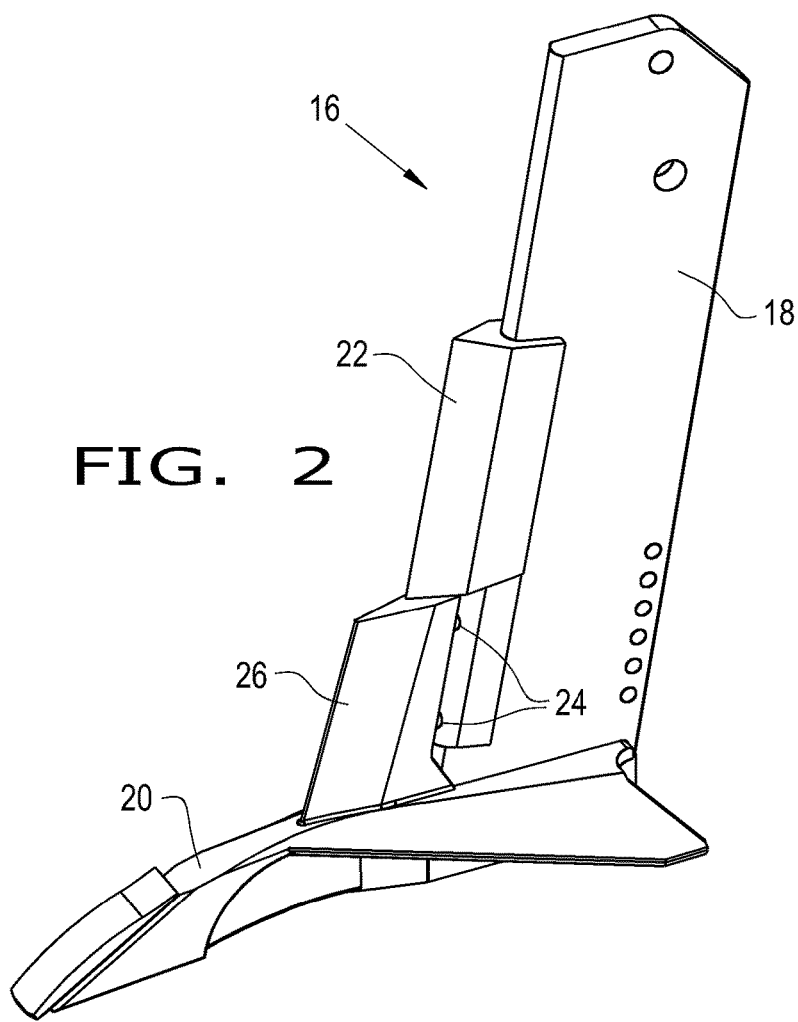
FIG. 2 illustrates a perspective view of a shank assembly of FIG. 1 which includes a shank, a point, and a shin removably connected in between the point and the shank.

Referring now to the drawings, and more particularly to FIGS. 1-2, there is shown an agricultural tillage implement 10 that generally includes a frame 12, wheels 14 supporting the frame 12, and various ground engaging tools, such as shank assemblies 16, which are mounted to the frame 12. The agricultural tillage implement 10 may be in the form of any desired ground-engaging implement, such as a field cultivator. Each shank assembly 16 may generally include a shank 18, a sweep or point 20, and a protective guard 22, e.g. shin 22.

The shank 18 of each shank assembly 16 is rotatably connected to the frame 12. The bottom end of the shank 18 may have one or more receiving holes (not shown) for receiving fastener(s) 24 therein in order to mount the point 20 and the shin 22 (FIG. 2). The shank 18 may be in the form of any desired shank. The shank 18 may have any desired shape, for example, the shank 18 may have an "L"-shaped cross-section. The shank 18 may be a rigid or semi-deformable member. The shank 18 may comprise any desired material, such as metal.

The point 20 may be removably connected to the front of the shank 18 at the bottom thereof. The point 20 may accordingly serve as the primary point of engagement with the soil. The point 20 may be designed to be replaceable as it wears over time. The point 20 may have an upper protrusion 26, e.g. a cast dorsal fin 26, which connects to the shank 18 by way of the fasteners 24 (FIG. 2). The point 20 may be in the form of any desired ground engaging member with any desired shape and size. The point 20 may comprise any desired material, such as metal.

Figure 3:
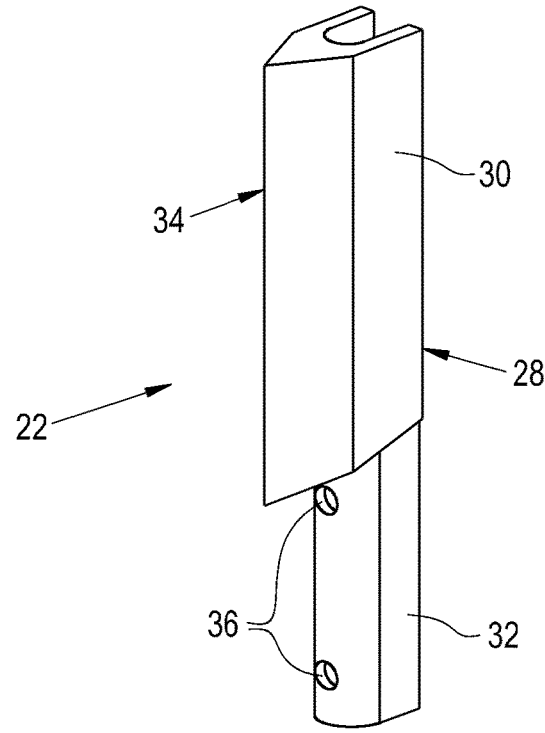
FIG. 3 illustrates a perspective view of the shin of FIG. 2.

Referring now collectively to FIGS. 2-3, there is shown the shin 22 of a respective shank assembly 16 which protects the front and sides of the shank 18. The shin 22 may be removably connected to the shank 18. More particularly, the protective shin 22 may be removably connected in between the point 20 and the shank 18, and the shin 22 may be secured onto the shank 18 by the same fastener(s) 24 which mount(s) the point 20 to the shank 18. In this regard, the point 20 retains the shin 22 on the shank 18. Thus, the shin 22 does not require any additional mounting hardware, e.g. brackets, pins, or fasteners, in order to secure the shin 22 onto the shank 18 except the mounting hardware which is already used to connect the point 20 to the shank 18. The shin 22 may also flex in response to a movement of the shank 18. For instance, the shin 22 may correspondingly move as the shank 18 moves side-to-side. The shin 22 may be designed to be replaceable as it wears over time.

The shin 22 has a shin body 28 with an upper portion 30 and a lower portion 32 (FIG. 3). When assembled, the shin 22 fits behind the point 20, which does not cover the upper portion 30 but does at least partially cover the lower portion 32, for example, only the front of the lower portion 32. Hence, the front surface of the shin 22 at least partially contacts and is covered by the point 20, and the rear surface of the shin 22 corresponds to and contacts the shank 18. The upper portion 30 has an upper shape with a crop-engaging protrusion 34 for engaging and diverting the soil from contacting the shank 18. The crop-engaging protrusion 34 is in the form of a plow 34 which has a triangular cross-section for splitting the soil around the shank 18. The lower portion 32 has a lower shape that is different than the upper shape and which only partially redirects the soil at the sides of the lower portion 32. The profiles of the front and rear of the lower portion 32 correspond to the rear profile of the point 20 and the front profile of the shank 18, respectively. The lower portion 32 also has at least one through hole 36 for receiving a respective fastener 24 therethrough. In this regard, the fastener(s) 24 may exclusively, i.e., solely, and jointly mount both of the point 20 and the shin 22 to the shank 18.

It should be appreciated that the shin 22 may be a uniform or multipart member. It should also be appreciated that the shin 22 may have any desired shape. For example, the shin 22 may not have differing upper and lower portions 30, 32 and may thereby have a uniform shape and cross-section. The shin 22 may comprise any desired material. For example, the shin 22 may be non-metallic and may be composed of plastic, such as an ultra-high molecular weight (UHMW) polyethylene.

In operation, the operator of the agricultural tillage implement 10 may replace the shin 22 as desired. The operator may attach the shin 22 by positioning the shin 22 in between the point 20 and the shank 18. Then, the point 20 may be fastened to the shank 18 with the fastener(s) 24 which simultaneously secure(s) the shin 22 to the shank 18. Once the shin 22 is worn, the operator may detach the shin 22 by unfastening the point 20 from the shank 18 and subsequently removing the shin 22 from the shank 18. Furthermore, the shin 22 and the point 20 may be replaced at the same time, which may thereby reduce maintenance cost.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A shank assembly for an agricultural tillage implement, comprising:
   a shank;
   a point removably connected to the shank through a fastener; and
   a protective guard removably connected in between the point and the shank wherein the protective guard is secured onto the shank by the fastener which mounts the point to the shank, such that the point retains the protective guard on the shank, and the protective guard being configured for protecting the shank and flexing in response to a movement of the shank.

2. The shank assembly of claim 1, wherein the protective guard comprises a front surface and a rear surface, the front surface at least partially contacts the point and is at least partially covered by the point, and the rear surface contacts the shank.

3. The shank assembly of claim 2, wherein the protective guard comprises a protective guard body with an upper portion and a lower portion which connects in between the point and the shank.

4. The shank assembly of claim 3, wherein the upper portion comprises an upper shape with a crop-engaging protrusion for engaging and diverting a soil from contacting the shank, and the lower portion comprises a lower shape that is different than the upper shape.

5. The shank assembly of claim 3, wherein the lower portion comprises at least one through hole for receiving the fastener therethrough, and the fastener jointly mounts the point and the protective guard to the shank.

6. The shank assembly of claim 5, wherein point at least partially covers the lower portion but does not cover the upper portion.

7. The shank assembly of claim 5, wherein the fastener exclusively mounts the point and the protective guard to the shank.

8. The shank assembly of claim 1, wherein no other mounting hardware is used to secure the protective guard to the shank except that which is used to connect the point to the shank.

9. The shank assembly of claim 1, wherein the protective guard is non-metallic.

10. The shank assembly of claim 9, wherein the protective guard comprises an ultra-high molecular weight (UHMW) polyethylene.

11. An agricultural tillage implement for an agricultural vehicle, comprising:
 a frame; and
 a shank assembly connected to the frame, comprising:
  a shank;
  a point removably connected to the shank through a fastener; and
  a protective guard removably connected in between the point and the shank wherein the protective guard is secured onto the shank by the fastener which mounts the point to the shank, such that the point retains the protective guard on the shank, and the protective guard being configured for protecting the shank and flexing in response to a movement of the shank.

12. The agricultural tillage implement of claim 11, wherein the protective guard comprises a front surface and a rear surface, the front surface at least partially contacts the point and is at least partially covered by the point, and the rear surface contacts the shank.

13. The agricultural tillage implement of claim 12, wherein the protective guard comprises a protective guard body with an upper portion and a lower portion which connects in between the point and the shank.

14. The agricultural tillage implement of claim 13, wherein the upper portion comprises an upper shape with a crop-engaging protrusion for engaging and diverting a soil from contacting the shank, and the lower portion comprises a lower shape that is different than the upper shape.

15. The agricultural tillage implement of claim 13, wherein the lower portion comprises at least one through hole for receiving the fastener therethrough, and the fastener jointly mounts the point and the protective guard to the shank.

16. The agricultural tillage implement of claim 15, wherein the fastener exclusively mounts the point and the protective guard to the shank.

17. The agricultural tillage implement of claim 11, wherein no other mounting hardware is used to secure the protective guard to the shank except that which is used to connect the point to the shank.

18. The agricultural tillage implement of claim 11, wherein the protective guard is non-metallic.

19. The agricultural tillage implement of claim 18, wherein the protective guard comprises an ultra-high molecular weight (UHMW) polyethylene.

* * * * *